United States Patent [19]

Miller

[11] Patent Number: 5,390,550

[45] Date of Patent: Feb. 21, 1995

[54] APPARATUS FOR MEASURING TENSION IN STRETCHED CABLES

[76] Inventor: George E. Miller, 161 Spruce St., Massapequa Park, N.Y. 11762

[21] Appl. No.: 67,731

[22] Filed: May 26, 1993

[51] Int. Cl.⁶ .................................................. G01L 5/00
[52] U.S. Cl. ............................. 73/862.46; 73/862.391
[58] Field of Search .................... 73/862.391, 862.451, 73/862.454, 862.46, 862.472

[56] References Cited

U.S. PATENT DOCUMENTS

| | | | |
|---|---|---|---|
| 2,872,808 | 2/1959 | Ney et al. | 73/862.46 |
| 3,679,808 | 7/1972 | Rohner et al. | 73/862.46 |
| 3,994,162 | 11/1976 | Auckland et al. | 73/862.46 |

Primary Examiner—Richard E. Chilcot, Jr.
Assistant Examiner—R. Biegel
Attorney, Agent, or Firm—Bauer & Schaffer

[57] ABSTRACT

A tension measuring apparatus for determining the tension in stretched cables, ropes, wires and the like.

4 Claims, 1 Drawing Sheet

U.S. Patent  Feb. 21, 1995  5,390,550
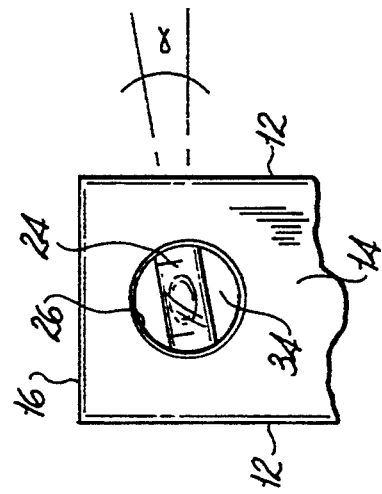
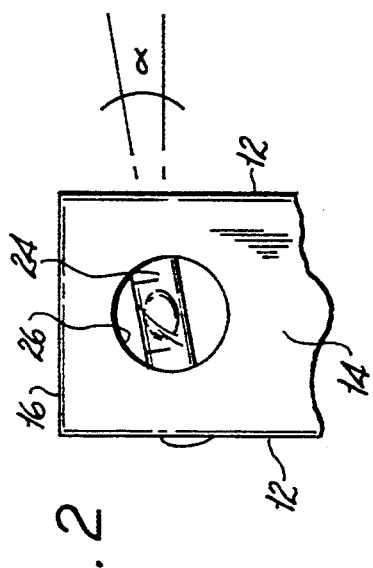
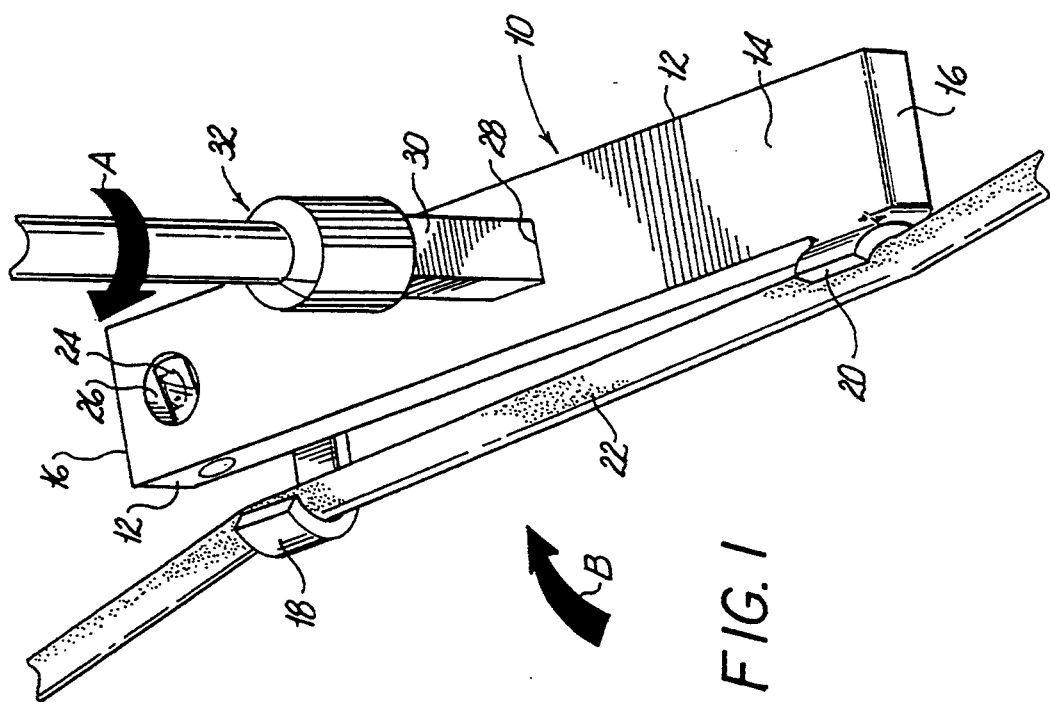

5,390,550

APPARATUS FOR MEASURING TENSION IN STRETCHED CABLES

BACKGROUND OF THE INVENTION

The present invention relates to tension measuring apparatus and in particular to apparatus for determining the tension in stretched cables, ropes, wires and the like.

There are numerous instances wherein cables, wires, ropes and the like (hereinafter generically referred to as cables) are used as guy wires, cable car supports and tugging devices where the cable is stretched and where the tension or force of stretching is required to be known.

Many devices commonly called tensionometers are well known for these purposes as reference to U.S. Pat. Nos. 1,400,776; 1,631,143; 1,722,036; 1,833,195; 2,872,808; 3,174,334; 3,608,371; and 4,135,393 will show. In general, these devices employ the principle of bend the cable and thereafter measuring the force necessary to hold the cable so deflected. Unfortunately, such devices are complex requiring, for example, a number of elaborate movable, interacting members; spring biased parts that have to be calibrated and properly scaled; and need a high degree of expertise and training to operate.

The object of the present invention is to provide a simple, highly portable tensionometer of high accuracy.

It is also an object of the present invention to provide apparatus for measuring the tension of a stretched cable in situ without separating or otherwise disturbing the continuity of the cable.

It is a further object of the present invention to provide apparatus by which the tension in a cable can be measured utilizing common readily available inexpensive tools.

The foregoing objects together with other objects and advantages of the present invention will be readily apparent from the following disclosure.

SUMMARY OF THE INVENTION

According to the present invention, the apparatus for measuring the tension of a stretched cable comprises a rigid rectilinear bar having a face and at least one longitudinal edge. A pair of cable engaging members, spaced one from the other, extend outwardly from the one longitudinal edge and a spirit level is mounted on the bar parallel to the face of the bar and at an angle to the longitudinal edge. A socket forming a recess for the output shaft of a torque wrench is located at the center of the face of the bar.

According to the present method, the bar is placed in engagement with the stretched cable with the longitudinal edge parallel to the cable and the spirit level at an angle. A torque wrench is inserted in the socket and operated to rotate the bar about the center axis of the socket, thereby deflecting the bar and the engaged cable. Deflection is continued until the bubble in the spirit level centers therein and the torque required to deflect the cable to this point is measured as correlative to the tension in the cable.

Full details of the apparatus and the method of the present invention are set forth in the following description and illustrated in the accompanying drawings.

BRIEF DESCRIPTION OF THE DRAWINGS

In the drawing:

FIG. 1 is a perspective view of the apparatus embodying the present invention,

FIG. 2 is an enlarged view of the end of the bar showing the position of the spirit level; and FIG. 3 is a view similar to that of FIG. 2 showing a rotatable spirit level.

DESCRIPTION OF THE INVENTION

It is, of course, to be understood that in the following description the apparatus and method are described as applied to a stretched cable. The reference to cable is illustrative as the invention can be used in determining the tension in rope, wire, or belts of any type which are stretched.

Turning now to FIG. 1, the apparatus comprises a generally parallelepiped (e.g. rectilinear) metallic bar generally depicted by the numeral 10. The bar 10 has elongate edges 12, a planar face 14 as well as ends 16. This shape is most convenient for fabrication as the bar may be cut easily from standard metal bar stock. However, this particular shape is not critical and the bar may have other shapes such as being ovoid, in cross-section, octagonal or even free form, provided it has at least one face having an adjacent elongate edge.

Mounted integrally with the bar 10 and extending from an elongate edge 12 outwardly therefrom are a pair of cable engaging members 18 and 20. The cable engaging member 18 is in the form of C-shaped hook adapted to engage over and hold the cable 22 as seen in FIG. 2. The other engaging member 20 is in the form of a clevis, such as a saddle or "U" into which the cable easily seats.

The face of the bar is provided with a window 26 between the hook engaging member 18 and the adjacent end 16. A spirit level 24 is mounted within the window 26 by force fitting the level through a hole 27 extending from the elongate edge through the body to the opposite elongate edge at an angle e from the transverse normal axis. The spirit level 24 may be a conventional mercury bubble level. It may, however, be another type if desired.

As seen in FIG. 3, the spirit level 24 can be mounted in a disc-like transparent housing 34 rotatably set within the window 26 so that the angle of the spirit level may be selectively varied.

The angle at which the spirit level is intermittently set is not critical although the angle should be sufficiently large to unable measurement of varyingly tensioned cables. For this reason, the angle alpha $\alpha$ may be fixed or variable with a range of 5°–30°.

At the center point of the bar 10 there is formed a multi-planar recess defining a socket 28 adapted to receive the head 30 of a torque wrench 32 illustrated only by its output shaft. Any conventional torque wrench can be used in combination with the present invention and therefore no further detail of such device is believed necessary here.

While the dimensions of the apparatus, i.e., the bar 10, are not critical, certain relationships should be observed. The length of the bar 10, defined by the elongate edge 12, should be larger than the width of the bar so that the cable engaging members 18 and 20 are spaced from each other a sufficient distance dependent on the diameter of the cable to effectively bend and flex the cable. The socket 28 should be centered in the face equidistant from each of the cable engaging members as it provides the center axis of rotation of the bar. The spirit level 24 should be spaced sufficiently from the center axis to lie on a convenient arc remote from the center so that even small rotation angles are reflected in the movement of the level's bubble.

The spirit level need not be mounted within the face, but may be mounted on the face. It may also be mounted on the edge 16 adjacent to the C-hook engaging member.

In carrying out the method of the present invention the bar 10 is made to engage the cable 22 which, as is understood, is held at its ends (not shown) in stretched condition. The cable 22 is hooked with the C-shaped engaging member 18 and seated within the opposite clevis shaped engaging member 20. The head 30 of the torque wrench 32 is thereafter secured in the socket 28 and operated to effect rotation in the direction of the arrow A. This causes the bar 10 to swing carrying the cable 22 in the direction of arrow B. Because the bar 10 is placed on the cable 22 so that its elongate edge 12 is parallel to the cable, the spirit level bubble is initially off center. Thus, swinging of the bar in the direction of arrow B will not only deflect the cable but also cause the bubble to re-center. Upon the spirit level centering, the operation of the wrench is stopped and the torque at that instance is read and correlated to the tension in the cable.

It is to be noted that because the wrench rotates the bar unidirectionally, the cable 22 is effectively held by the C-hook engaging member 18 and the U engaging member 20 without slippage. The section of the cable between the two engaging members always remains parallel to the elongate edge no matter how the cable itself is deflected from its initial position. This ensures a uniform measurement of the cable.

It will be observed that both the apparatus and the method are quire simple. No relatively movable parts are necessary, the bar is easily attached to the cable and the operator has only to view a single spirit level to determine completion of the operation. Conventional torque wrenches can be used from which the level of stress and/or tension can be easily determined.

Various changes and modifications have been described herein. Other modifications will be obvious to those skilled in this art. Therefore, it is intended that the present disclosure be taken as illustrative and not limiting of the invention.

What is claimed:

1. Apparatus for measuring the tension of a statically stretched cable comprising a bar having at least one face and one longitudinal edge, a cable engaging member located at each end of said bar and extending outwardly from the one longitudinal edge substantially parallel to the plane of the face of said bar, a spirit level mounted on said bar adjacent one end, parallel to the face of said bar and extending at an angle to said longitudinal edge and a recess spaced from said spirit level formed in said bar perpendicular to the face of said bar in which a torque wrench is applied whereby on application of a torque to said bar, the bar deflects the stretched cable and the spirit level brought to center, at which time the tension in said cable is determined.

2. The apparatus according to claim 1 wherein said spirit level is recessed within the bar.

3. The apparatus according to claim 2 wherein the spirit level is set at a predetermined angle to the longitudinal edge.

4. The apparatus according to claim 2 wherein the spirit level is rotatably mounted within the bar permitting adjustment of the angle of said spirit level.

* * * * *